United States Patent

Ishikawa

[11] Patent Number: 5,352,074
[45] Date of Patent: Oct. 4, 1994

[54] TOOL MOUNTING APPARATUS

[75] Inventor: Hitoshi Ishikawa, Takahama, Japan

[73] Assignee: NT Tool Kabushikikaisha, Japan

[21] Appl. No.: 140,911

[22] Filed: Oct. 25, 1993

[30] Foreign Application Priority Data

Oct. 26, 1992 [JP] Japan .................. 4-310908

[51] Int. Cl.$^5$ .............................. B23C 5/26
[52] U.S. Cl. ..................... 409/232; 279/75;
279/91; 279/904; 408/239 A
[58] Field of Search ............ 409/232, 234, 233;
408/239 R, 239 A, 240; 279/905, 900, 71, 75,
81, 78, 90, 91, 904

[56] References Cited

U.S. PATENT DOCUMENTS

| | | | |
|---|---|---|---|
| 3,564,969 | 2/1971 | Kimmelaar | 409/232 |
| 3,658,352 | 4/1972 | Koch et al. | 279/904 X |
| 3,743,307 | 7/1973 | Benjamin et al. | 279/91 |
| 4,328,975 | 5/1982 | Heguy et al. | 409/234 X |
| 4,585,380 | 4/1986 | Naito | 409/234 |

FOREIGN PATENT DOCUMENTS 231609 2/1990 Japan .

*Primary Examiner*—Z. R. Bilinsky
*Attorney, Agent, or Firm*—William A. Drucker

[57] ABSTRACT

A tool mounting apparatus comprises a main shaft including an insertion hole and a stop flange, and an insertion part including a main body, an annular engage member disposed around the main body, wedge members and an annular clamp member disposed outside the annular engage member and biased in the axial direction. When the main body with a tool mounted is put in and abuts the insertion hole and lock nails formed on the annular engage member engage the stop flange, the wedge members are held firmly by the annular clamp member in the bottom portion of the space between a first receive wall provided on the main body and a second receive wall provided on the annular engage member. The tensile force exerted from a work piece through the first wall, the wedge members, the second wall and the lock nails is borne by the stop flange and does not move the tool.

6 Claims, 6 Drawing Sheets

TOOL MOUNTING APPARATUS

Background of the Invention

1. Field of the Invention

This invention relates to an apparatus which mounts cutting tools such as drills or endmills on a main shaft of a machine tool and more particularly to a tool mounting apparatus which can mount or dismount the cutting tools easily and swiftly.

2. Description of the Prior Art

The following apparatus is one of tool mounting apparatus of this type. As shown in FIGS. 14 and 15, a tool mounting apparatus comprises a main shaft $1h$ and an insertion part $2h$. The main shaft $1h$ includes an insertion hole $3h$ with open and closed ends, a receive surface $61h$ around the open end of the insertion hole $3h$ and a stop flange $10h$ extending radially. On the other hand, the insertion part $2h$ includes a main body $15h$ and an annular engage member $16h$ disposed around the main body $15h$. The main body $15h$ is formed, at one end portion thereof, with an insertion rod $20h$ conformable to the insertion hole $3h$ and, at the other end thereof, with a tool mount $23h$ and with an abutment surface $62h$ adapted to abut the receive surface $61h$ when the insertion rod $20h$ is put in the insertion hole $3h$. The annular engage member $16h$ is formed with lock nails $34h$ adapted to engage a rear end surface of the stop flange $10h$. The annular engage member $16h$ is connected to the main body $15h$ by a resilient member $70$ adapted to bias the annular engage member $16h$ away from the main body $15h$ when the abutment surface $62h$ is abutting the receive surface $61h$ and the lock nails $34h$ are engaging the stop flange $10h$.

In the tool mounting apparatus of this type, a tool put beforehand in the tool mount $23h$ can be mounted on the main shaft $1h$ by a simple operation to insert the insertion rod $20h$ into the insertion hole $3h$ so as to make the abutment surface $62h$ abut the receive surface $61h$ and to make the lock nails $34h$ engage the stop flange $10h$, and can be dismounted from the main shaft $1h$ by a reverse operation. Since the annular engage member $16h$ for mounting and dismounting the tool is provided in the insertion part $2h$ of the tool mounting apparatus, namely since the main shaft $1h$ requires only a small space sufficient to put therein the small stop flange $10h$ to be engaged by the lock nails $34h$ but no large space so put therein the annular engage member $16h$ having a large axial size, the main shaft $1h$ can be the smaller in the axial length. Accordingly, the main shaft $1h$ can be made difficult to be bent by a bending force exerted in a direction crossing the axis of the main shaft $1h$ and the transverse deflection of the tool can be effectively prevented.

The tool mounting apparatus of the above mentioned construction, however, has the following problems. When an endmill is used as an example of the tool, a tensile force in the direction shown by an arrow $57h$ in FIG. 15 is sometimes exerted on the tool by a work piece. This force is exerted on the resilient member $70$ through the main body $15h$ in the insertion part $2h$. Consequently, if the force is stronger than the resilient force of the resilient member $70$, it is constricted as shown in FIG. 16 and the main body $15h$ moves in the direction of the arrow $57h$. This movement of the main body $15h$ is nothing but the axial movement of the tool. As a result, the machining accuracy of the work piece is lowered and the finished surface of the work becomes rough.

SUMMARY OF THE INVENTION

An object of the present invention is to provide a tool mounting apparatus which can mount tools on and dismount them from a main shaft of a machine tool easily and swiftly.

Another object of the present invention is to provide a tool mounting apparatus wherein the main shaft of a machine tool can be small in the axial size and be made difficult to be bent by a force exerted in a direction crossing the axis of the main shaft.

Still another object of the present invention is to provide a tool mounting apparatus wherein a mounted tool can be firmly held against a tensile force exerted on the tool by a work piece to be machined by the tool, resulting in improved finished accuracy and neat finished surface of the work piece.

A tool mounting apparatus according to the present invention comprises main shaft including an insertion hole and a stop flange, and an insertion part including a main body, an annular engage member disposed around the main body, wedge members and an annular clamp member disposed outside the annular engage member and biased in the axial direction. When the main body with a tool mounted is put in and abuts the insertion hole and lock nails formed on the annular engage member engage the stop flange, the wedge members are held firmly by the annular clamp member in the bottom portion of the space between a first receive wall provided on the main body and a second receive wall provided on the annular engage member. The tensile force exerted from a work piece through the first wall, the wedge members, the second wall and the lock nails is borne by the stop flange and does not move the tool.

DESCRIPTION OF THE PREFERRED EMBODIMENT

Figure 1:
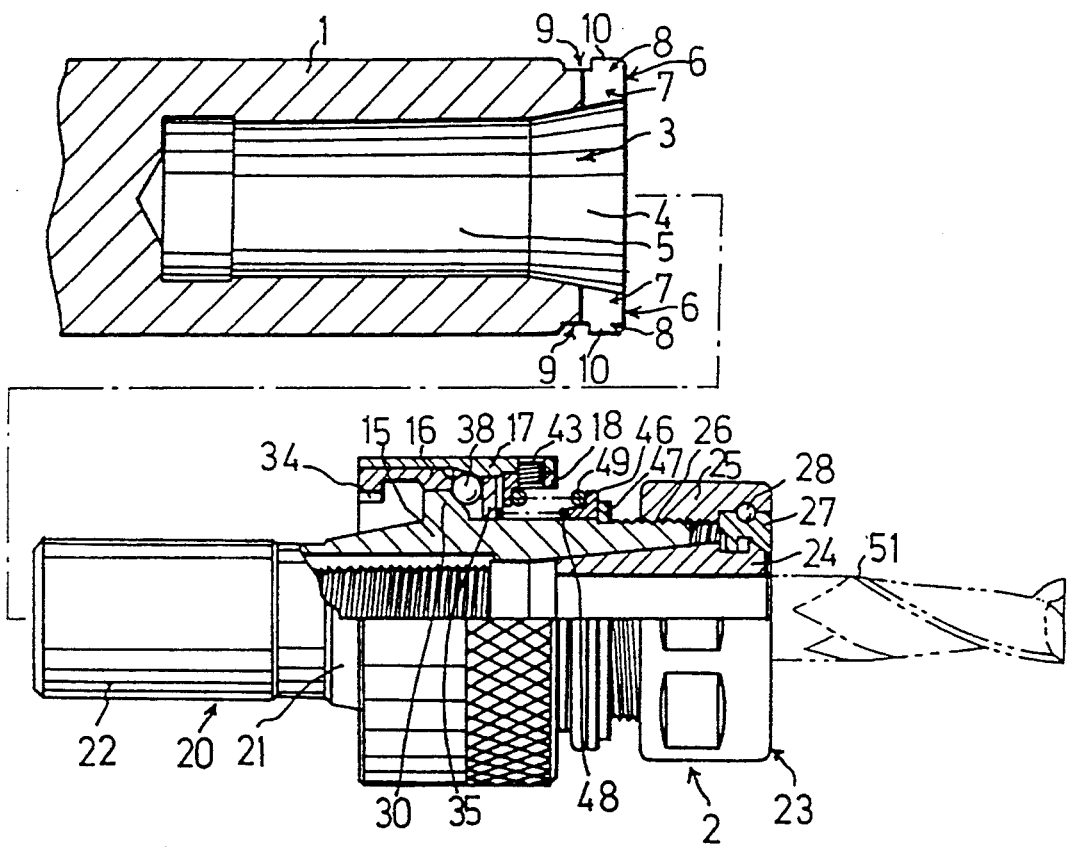
FIG. 1 is a view showing a tool mounting apparatus in partial section with a main shaft and an insertion part being separated.
Figure 2:
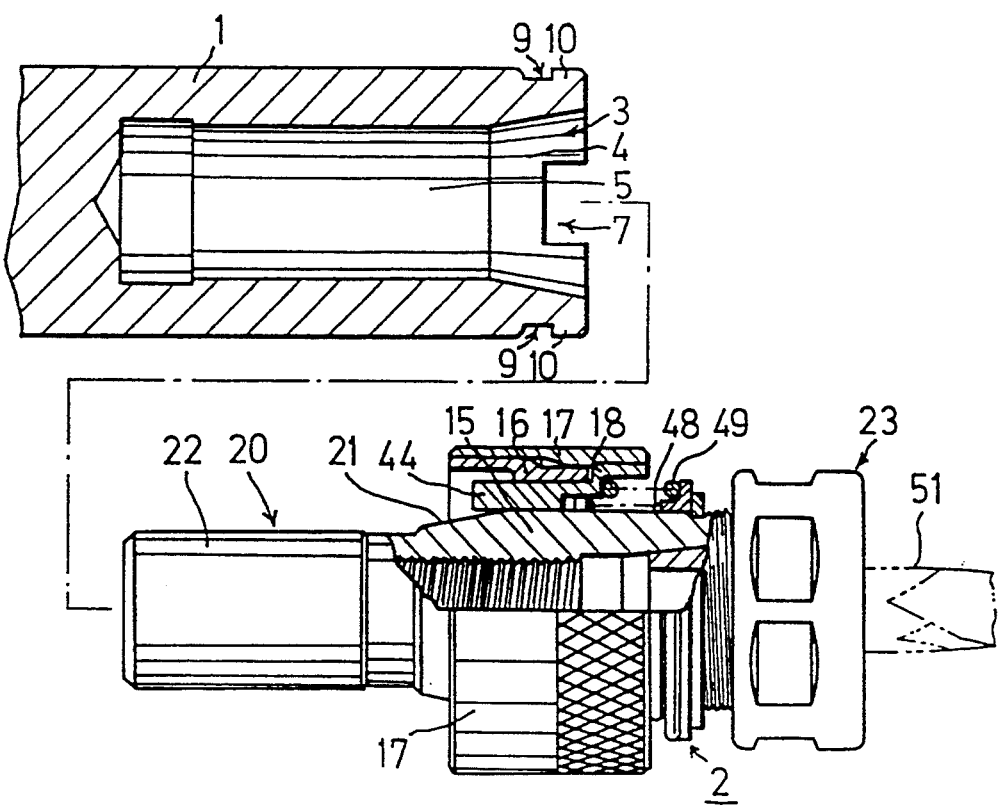
FIG. 2 is view similar to FIG. 1 except that the insertion part is shown in partial section along a cross section different by 90 degrees from that in FIG. 1.
Figure 3:
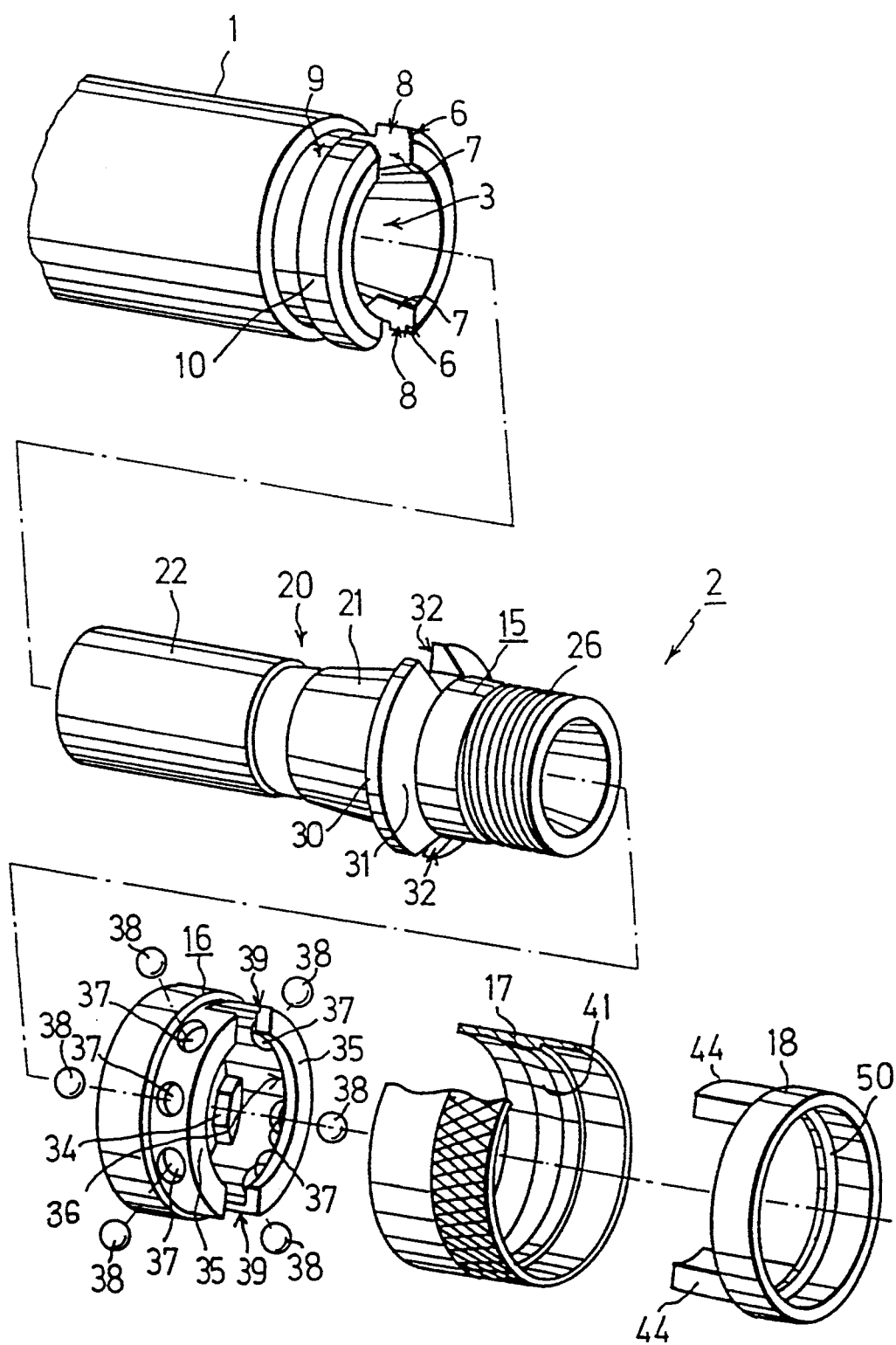
FIG. 3 is a perspective view of the disassembled tool mounting apparatus.

In FIGS. 1 through 3, a tool mounting apparatus comprises a main shaft 1 of a machine tool and a insertion part 2. The main shaft 1 is formed with an insertion hole 3 with open and closed ends. This insertion hole 3 is formed, at the open side thereof, with a conical surface 4 and, at the closed end side thereof, with a cylindrical surface 5 and the conical surface 4 is adapted to function as a receive surface for the insertion part 2. Two notches 6 are formed in the front end portion of the main shaft 1. The inner half of each notch 6 is adapted to function as a fitting depression 7 to prevent the insertion part 2 from turning relative to the main shaft 1 and the outer half to function as a pass groove 8 for introducing lock nails to be described later. The main shaft 1 is formed, on the outer side surface thereof, with an engage groove 9 contiguous to the pass groove 8 and a radially protruding stop flange 10 is formed between the engage groove 9 and the front end surface of the main shaft 1.

Figure 8:
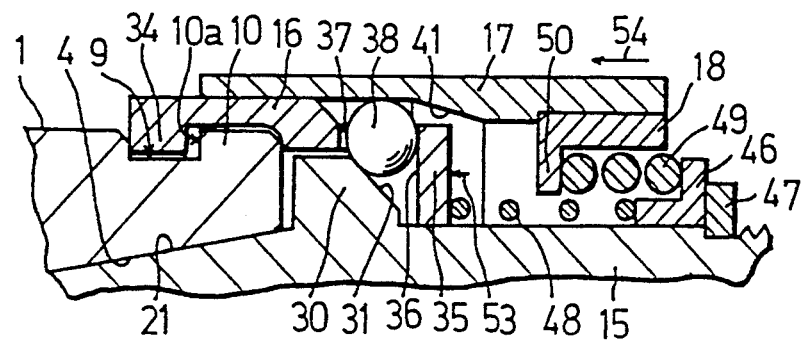
FIG. 8 is an enlarged fragmental view showing the main portion in FIG. 4.

The insertion part 2 includes principally three members of a main body 15, an annular engage member 16 disposed around the main body 15 and an annular clamp member 17 disposed outside the member 16. As is shown in FIG. 3, the annular clamp member 17 is provided with an annular connecting member 18 to be described later. The main body 15 is formed, at the rear end portion thereof, with an insertion rod 20. The insertion rod 20 is formed with a conical rod 21 and a cylindrical rod 22 which are conformable to the conical surface 4 and the cylindrical surface 5 of the insertion hole 3, respectively. In this embodiment, the outside surface of the conical rod 21 is formed as the aforementioned abutment surface to abut the receive surface. The main body 15 is formed, at the front end portion thereof, with a tool mount 23. A collet chuck is used as an example of this tool mount 23. The collet chuck is constructed in a well known manner and comprises a corret 24, a fastening cap 25 in mesh with a threaded portion 26 on the main body 15 and a combination of an annular connecting member 27 and balls 28 for connecting the fastening cap 25 to the collet 24. The main body 15 is formed, at the intermediate outer portion thereof, with a flange 30. As is shown in FIG. 8, the front end surface of the flange 30 forms a first receive wall 31 to receive wedge members. As is shown in FIG. 3, the flange 30 is formed with a pair of cuts 32 at diametrically opposite positions.

The annular engage member 16 is provided, on the inner surface of the rear end portion thereof, with lock nails 34. The lock nails 34 are provided at two positions in accordance with the aforementioned pass grooves 8. The annular engage member 16 is formed, on the inner surface of the front end portion thereof, with a inner flange member 35. As shown in FIG. 8, the rear side surface of the flange member 35 is formed as a second receive wall 36 to receive wedge members and is facing the first receive wall 31. As is clear in FIG. 8, the separation between the first and the second receive walls increases with increasing radial distance from the axis of the main body 15. As shown in FIG. 3, a number of holding holes 37 contiguous to the receive wall 36 are formed in the annular engage member 16 and wedge members 38 are disposed in or near the holding holes 37 and in the space between the receive walls 31 and 36. Hard steel balls are used as the wedge members 38. The wedge members 38 are adapted to be movable radially from the axis of the main body 15 with the holding holes as retreat spaces. The wedge members 38 may be in any other arbitrary form such as the form of rollers, so long as the form is suitable for the radial movement of the wedge members 38. As shown in FIG. 3, the annular engage member 16 is formed, at two positions thereof, with respective cuts 39 corresponding to the aforementioned cuts 32.

That inner surface of the annular clamp member 17 which is to face the holding holes 37 is tapered and forms a tilted thrust surface 41 to push the wedge members 38 radially. The aforementioned annular connecting member 18 is, as shown in FIG. 1, fastened on the annular clamp member 17 by screws 43. As shown in FIG. 3, the annular connecting member 18 is provided with two projecting pieces 44, which protrude through the cuts 39 and 32 towards the insertion rod 20 of the main body 15.

Next a construction is described which is adapted to bias the annular engage member 16 and the annular clamp member 17 towards the insertion rod 20. As shown in FIGS. 1 and 2, a spring seat 46 is provided on the outside surface of the main body 15 and is positioned by a stopper 47 secured on the main body 15. A compression spring 48 is inserted between the spring seat 46 and the flange member 35 in the annular engage member 16. Furthermore, another compression spring 49 stronger than the spring 48 is inserted between the spring seat 46 and a spring seat 50 provided on the annular connecting member 18.

Figure 10:
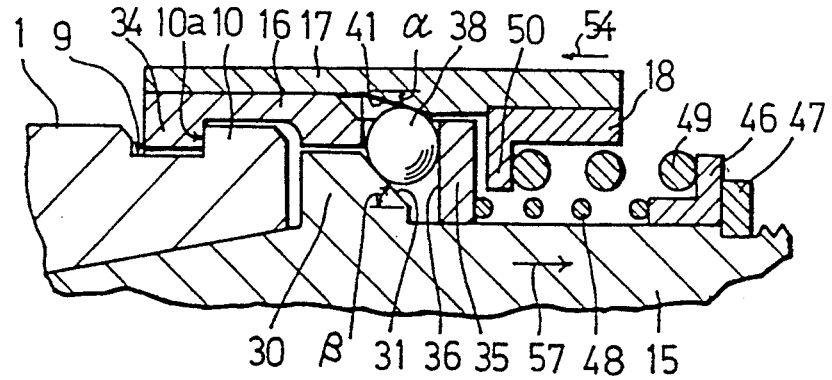
FIG. 10 is an enlarged fragmental view showing the main portion of FIG. 6.

Now is described how to use the tool mounting apparatus of the above mentioned construction. First, a tool such as an endmill 51 is beforehand secured in the tool mount 23 as shown in FIG. 1. Next, the insertion rod 20 is put into the insertion hole 3 from the position of the rod 20 shown in FIGS. 1 and 2 to that in FIGS. 4 and 5 and the conical rod 21 is brought into contact with the conical surface 4. In this case, the angular position of the insertion part 2 relative to the main shaft 1 is adjusted so that the lock nails 34 can move through the pass grooves 8. When the insertion part 2 is put in the hole 3 in this manner, the rear end surfaces of the projecting pieces 44 abut the front end surface 1a of the main shaft 1, the spring 49 is compressed, the annular clamp member 17 is displaced relative to the main body 15 towards the tool mount 23, and the large radius side of the thrust surface 41 faces the wedge members 38. Next the insertion part 2 is rotated relative to the main shaft 1 in the clockwise or counterclockwise direction by 90 degrees. Then the projecting pieces 44 are caused to engage the fitting depressions 7 by the biasing force of the spring 49 as shown in FIG. 7 and consequently the insertion part 2 is prevented from rotating relative to the main shaft 1. The annular clamp member 17 is moved to the position thereof shown in FIG. 6 by the force of the spring 49 and the thrust surface 41 pushes the wedge members 38 towards the bottom portion of the space between the first receive wall 31 and the second receive wall 36 as shown in FIG. 10. As a result, the lock nails 34 engage the rear end surface 10a of the stop flange 10 and the insertion part 2 is fixed to the main shaft 1.

Figure 4:
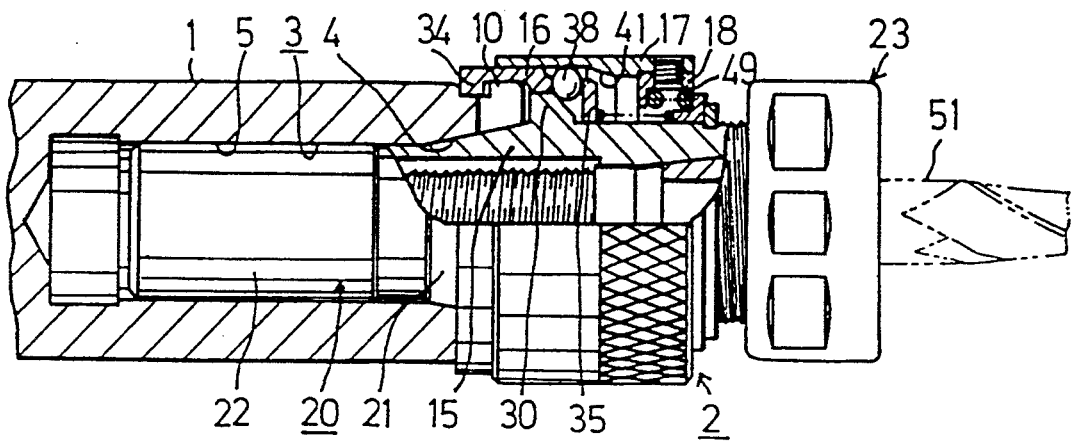
FIG. 4 is a view showing the insertion part put from the position shown in FIG. 1 into an insertion hole of the main shaft.
Figure 5:
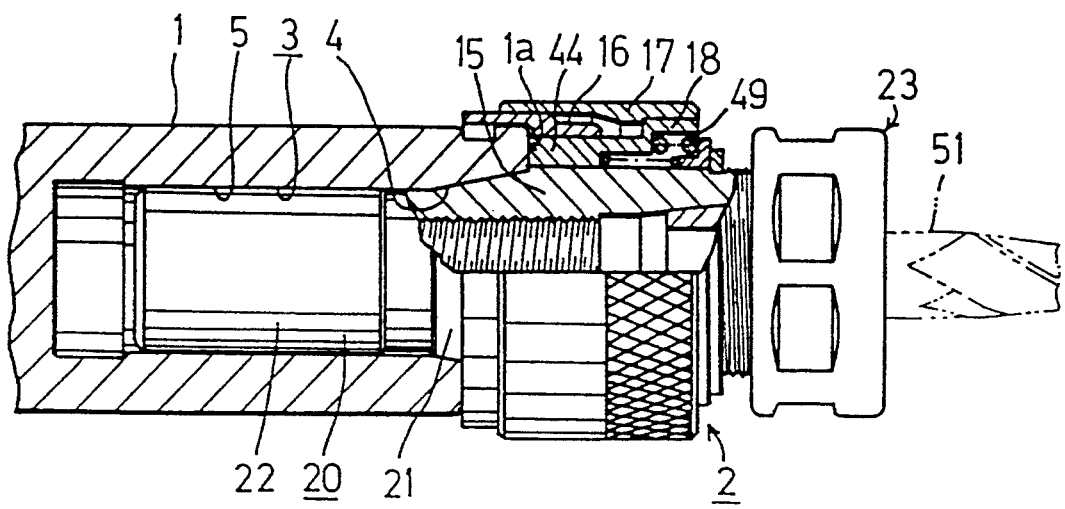
FIG. 5 is a view similar to FIG. 4 but shown in partial section along the same cross section as in FIG. 2.
Figure 6:
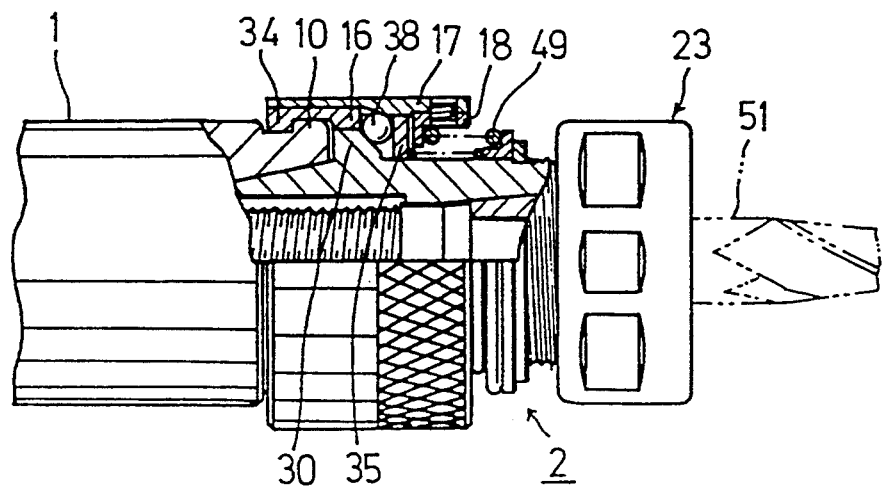
FIG. 6 is a view showing the insertion part completely assembled in the main shaft, the insertion part being shown in partial section along the same cross section as in FIG. 4.
Figure 7:
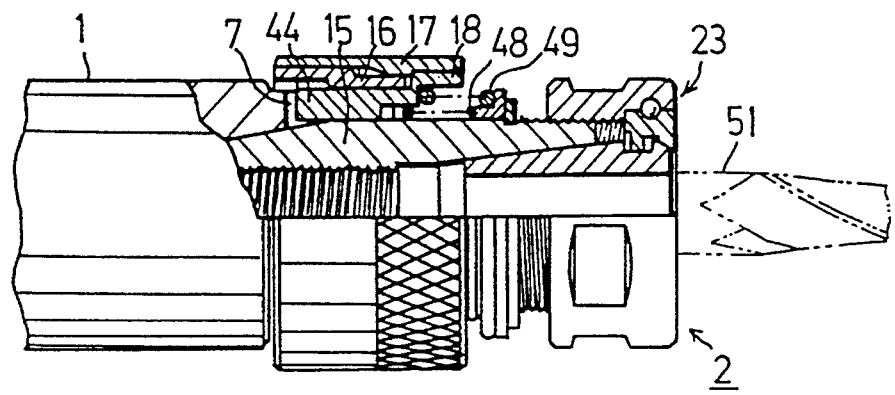
FIG. 7 is a view similar to FIG. 6, with the insertion part being shown in partial section along the same cross section as in FIG. 5.
Figure 9:
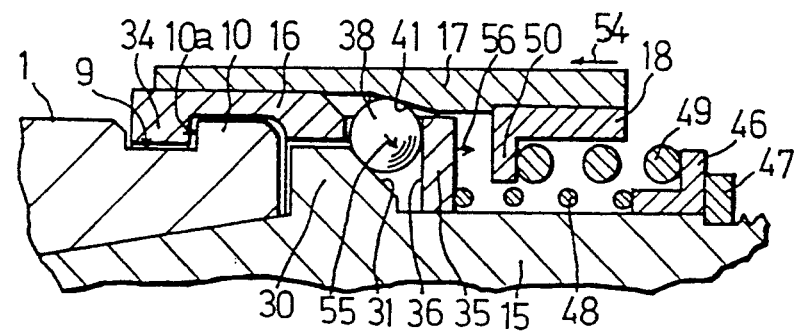
FIG. 9 is a view similar to FIG. 8 but shown at an instance just after the beginning of the operation of an annular clamp member.

In the next place, the operation from the state shown in FIGS. 4 to that shown in FIG. 6 is explained in details with reference to FIGS. 8 through 10. First in FIG. 8, the annular engage member 16 is pushed by the biasing force of the spring 48 in the direction shown by an arrow 53 and the lock nails 34 are kept away from the end surface 10a. At this time, the wedge members 38 are pushed out radially by the receive walls 31 and 36 defining a space with V-shaped cross section. In this situation, the aforementioned projecting pieces 44 abut the fitting depressions 7, making the biasing force of the spring 49 be exerted on the annular clamp member 17 and this member begins to move from the position thereof shown in FIG. 8 in the direction shown by an arrow 54. The thrust surface 41 of the annular clamp member 17 begins to push the wedge members 38 radially towards the bottom portion of the space between the receive walls 31 and 36 as shown in FIG. 9. The annular engage member 16 is moved by the pushed wedge members 38 against the biasing force of the spring 48 in the direction shown by an arrow 56 and the lock nails 34 approach the end surface 10a. When the wedge members 38 are pushed still deeper, the lock nails 34 abut the end surface 10a, the annular clamp member 17, the annular engage member 16 and the wedge members 38 stop moving, and the insertion part 2 becomes fixed relative to the main shaft 1.

The main shaft 1 with the tool 51 mounted thereon is rotated in a well known manner and machinery cut is made on a work piece by the tool 51. Even when a tensile force is exerted by the work piece on the tool 51 and on the main body 15 in the direction shown by an arrow 57 in FIG. 10 in the case of this machinery cut, the main shaft 1 is reliably prevented from moving in this direction by the following series of operations. Namely, when the tensile force in the direction of the arrow 57 is exerted on the main body 15, the force is exerted through the first receive wall 31 on the wedge members 38 as a force to push out them radially (in the upward direction in FIG. 10). Since the annular clamp member 17, however, is biased by the spring 49 in the direction of the arrow 54 and besides the thrust surface 41 forms a gentle slope, the wedge members 38 are firmly prevented from being pushed out radially. Consequently, the tensile force is exerted through the wedge members 38 on the second receive wall 36. Since the lock nails 34 integral with the annular engage member 16, however, engage firmly the stop flange 10, this member, though connected to the wall 36, does not move in the direction of the arrow 57. Accordingly, the main body 15 is reliably prevented from moving in the direction of the arrow 57.

The larger is the angle $\beta$ which the receive wall 36 makes with the axis of the insertion part 2 or the smaller the angle $\alpha$ which the thrust surface 41 makes with the axis, the wedge members 38 can be prevented the more reliably from being pushed out radially even with a weak biasing force of the spring 49 and the members 38 can tolerate the stronger tensile force. On the contrary, the smaller is the angle $\beta$ or the larger is the angle $\alpha$, the stroke can be the shorter which the annular clamp member 17 has to make in the operations shown in FIGS. 8 through 10. Accordingly, it is advisable to determine the values of the angles $\alpha$ and $\beta$ in accordance with uses and types of tool mounting apparatus and the angle $\alpha$ is preferably $10 \sim 20$ degrees, such as 15 degrees, and the angle $\beta 30 \sim 60$ degrees, such as 45 degrees in the case of the tool mounting apparatus for the above mentioned drill and endmill for example.

When the tool 51 is dismounted from the main shaft 1, the annular clamp member 17 is first pulled out against the biasing force of the spring 49 towards the tool mount 23. The projecting pieces 44 get out of the fitting depressions 7. Next, the insertion part 2 is rotated relative to the main shaft 1 by 90 degrees clockwise or couterclockwise. Then the lock nails 34 come to the pass grooves 8. The insertion rod 20 with the lock nails 34 facing the pass grooves 8 is pulled out of the insertion hole 23 and the tool 51 is separated from the main shaft 1.

Figure 11:
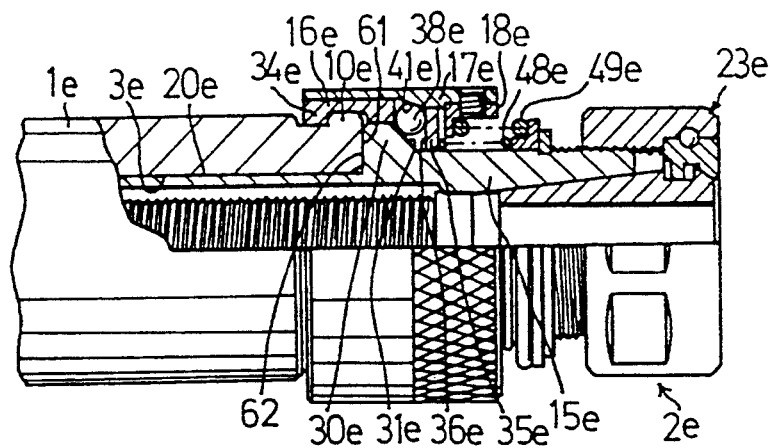
FIG. 11 is a view in partial section showing another embodiment with a different relationship between an abutment surface and a receive surface.

In the next place, FIG. 11 shows a different embodiment of the present invention wherein both an insertion hole 3e of a main shaft 1e and an insertion rod 20e of an insertion part 2e are formed with respective cylindrical portions alone, an end surface 61 of the main shaft 1e near the open end of the insertion hole 3e forms a receive surface, and a side surface 62 of a flange 30e of a main body 15e in an insertion part 2e is adapted to function as an abutment surface. Members in this figure which are the same as or considered to be equivalent in view of construction to those in previous figures are represented by the same reference numerals with an alphabet e and the explanation of these members is omitted. (Same or equivalent members in the following figures are similarly represented by the same reference numerals with an alphabet f or g and the explanation of them is omitted.)

Figure 12:
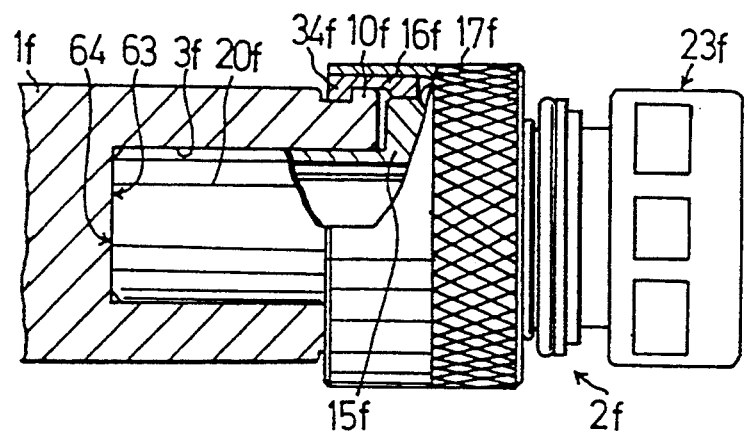
FIG. 12 is still another embodiment with a still different relationship between the abutment surface and the receive surface.

Next, FIG. 12 shows a still different embodiment of the present invention wherein both an insertion hole 3f and an insertion rod 20f are formed with respective cylindrical portions alone similarly as in the embodiment of FIG. 11, a bottom surface 63 of the insertion hole 3f forms a receive surface and an end surface 64 of an insertion part 2f forms an abutment surface.

Figure 13:
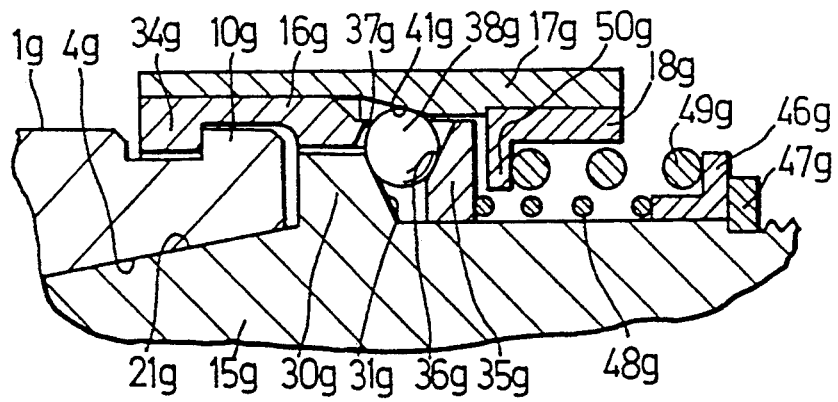
FIG. 13 is an enlarged fragmental view showing the main portion of still another embodiment with a first and a second receive walls being tilted in a different manner.
Figure 14:
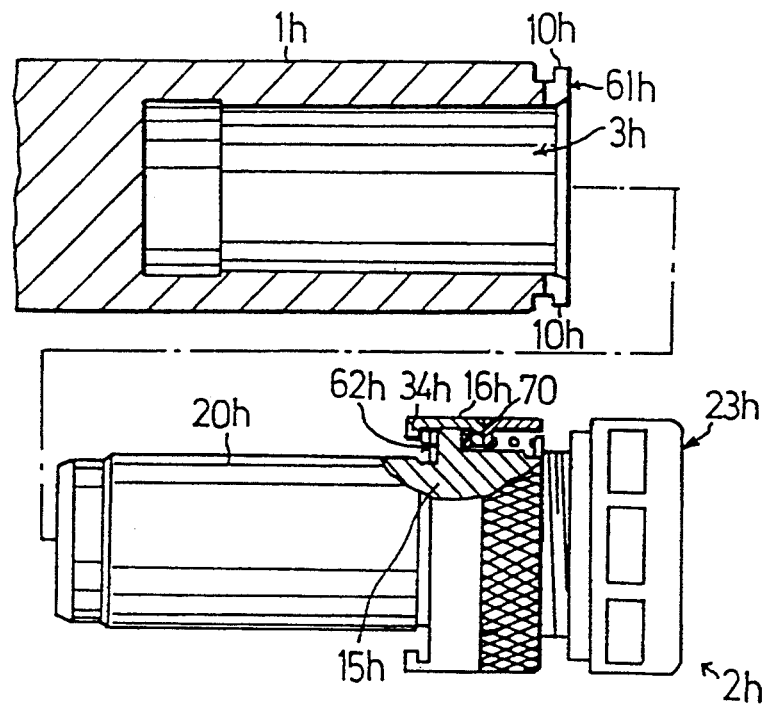
FIG. 14 is a view showing a conventional tool mounting apparatus in partial section.
Figure 15:
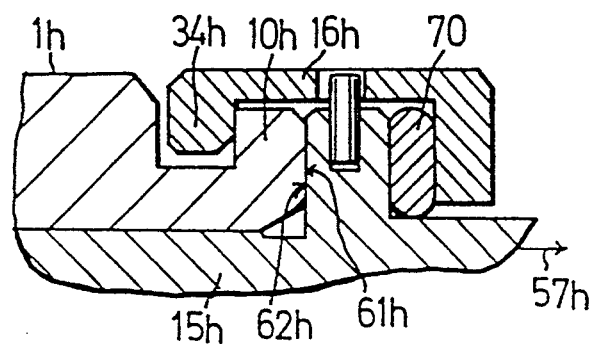
FIG. 15 is an enlarged fragmental view showing the main portion of the completely assembled apparatus in FIG. 14
Figure 16:
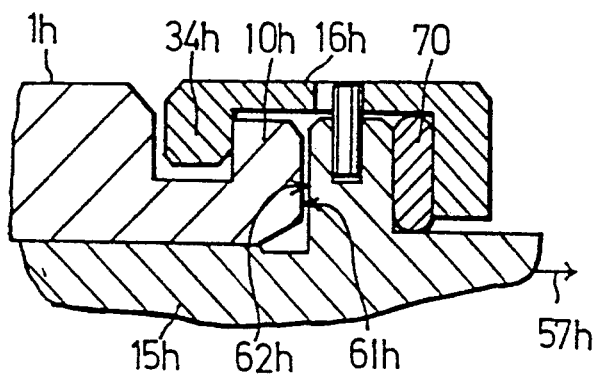
FIG. 16 is a view showing the apparatus of FIG. 15 in section with a main body in an insertion part being subject to a strong tensile force.

Next, FIG. 13 shows a still different embodiment of the present invention wherein both a first receive wall 31g and a second receive wall 36g are formed as tilted walls as shown. In a still different embodiment, the first receive wall 31g may be formed as a wall crossing the axis of a main body 1g at right angles.

As is described above, the present invention achieves the aforementioned objects thereof and has an effect that the tool mounting apparatus can firmly hold the tool against the tensile force exerted on the tool by the work piece.

As many apparently widely different embodiments of this invention may be made without departing from the spirit and scope thereof, it is to be understood that the invention is not limited to the specific embodiments thereof except as defined in the appended claims

What is claimed is:

1. A tool mounting apparatus comprising;
   a main shaft including an insertion hole with open end, a receive surface and a stop flange and an insertion part including (a) a main body which is formed, at the rear end thereof, with an insertion rod conformable to said insertion hole and, at the front end thereof, with a tool mount, with an abutment surface adapted to abut said receive surface when said insertion rod is put in said insertion hole and with a first receive wall formed on the outside surface of said main body and directed towards said tool mount, (b) an annular engage member which is disposed around said main body, is formed with lock nails adapted to make said annular engage member engage said stop flange when said abutment surface is abutting said receive surface and with holding holes, and is provided with a second receive wall facing said first receive wall, the separation between said first and second receive walls increasing with increasing radial distance from the axis of said main body, (c) wedge members disposed between said receive walls and adapted to be movable radially relative to the axis of said main body with said holding holes as retreat spaces and (d) an annular clamp member which is disposed outside said annular engage member, is adapted to be movable in the axial direction of said main body, is formed, at the inner surface thereof facing said wedge members, with a tilted thrust surface and is biased in said axial direction so as to make said thrust surface push in said wedge members radially.

2. A tool mounting apparatus as set forth in claim 1 wherein said insertion hole and said insertion part are formed with conformable conical portions and the inside surface of said hole and the outside surface of said part form said receive surface and said abutment surface, respectively.

3. A tool mounting apparatus as set forth in claim 1 wherein said insertion hole is formed with a cylindrical portion alone and the front end surface of said main shaft near the open end of said insertion hole forms said receive surface.

4. A tool mounting apparatus as set forth in claim 1 wherein said insertion hole is formed with a cylindrical portion and the bottom surface of said insertion hole forms said receive surface.

5. A tool mounting apparatus as set forth in claim 1 wherein said wedge members are spherical bodies.

6. A tool mounting apparatus as set forth in claim 1 wherein fitting depressions are formed in said main shaft around the open end of said insertion hole, said annular clamp member in said insertion part is biased towards said insertion rod in said main body, and said annular clamp member is provided with projecting pieces adapted to engage said fitting depressions when said lock nails engage said stop flange.

* * * * *